United States Patent [19]

Nagata et al.

[11] 4,380,393
[45] Apr. 19, 1983

[54] GRAZING INCIDENCE SPECTROMETER

[75] Inventors: Hiroshi Nagata, Tokyo; Kazuo Sano; Jiro Morimoto, both of Kawasaki; Makoto Shiho, Tokaimura, all of Japan

[73] Assignee: Nippon Kogaku K.K., Tokyo, Japan

[21] Appl. No.: 247,757

[22] Filed: Mar. 26, 1981

[30] Foreign Application Priority Data

Mar. 31, 1980 [JP] Japan .................................. 55-40295

[51] Int. Cl.$^3$ .............................................. G01J 3/38
[52] U.S. Cl. ................................................. 356/328
[58] Field of Search ...................... 356/305, 328, 334; 350/3.7, 162 R; 250/280, 372

[56] References Cited

U.S. PATENT DOCUMENTS

| 3,628,849 | 12/1971 | Flamand et al. | 350/162 R |
| 4,027,975 | 6/1977 | Turner et al. | 350/162 R X |
| 4,063,818 | 12/1977 | Lepere | 350/162 R X |
| 4,087,183 | 5/1978 | Passereau | 356/305 |
| 4,191,474 | 3/1980 | Passereau | 356/305 |

OTHER PUBLICATIONS

Hayat et al., *Optical Engineering*, vol. 14, No. 5 Sep.–Oct. 1975, pp. 420–425.

Povlycheva, *Sov. J. Opt. Technol.*, vol. 46, No. 7, Jul. 1979, pp. 394–396.

Fukuda et al., *Japanese Journal of Applied Physics*, vol. 19, No. 3, Mar. 1980, pp. 537–545.

*Primary Examiner*—F. L. Evans
*Attorney, Agent, or Firm*—Fitzpatrick, Cella, Harper & Scinto

[57] ABSTRACT

A grazing incidence spectrometer is provided with an entrance slit and a diffraction grating for diffracting the light rays incident thereon from the entrance slit and for imaging the light rays as a plurality of spectral lines. The diffraction grating is a curved diffraction grating having a predetermined principal radius of curvature and the groove patterns thereof are formed at unequal intervals so as to make the image plane thereof substantially planar. The entrance slit is disposed within a Rowland circle so as to satisfy $$0.7 \leq r/R \cos \alpha \leq 0.9,$$

where R is the principal radius of curvature of the curved diffraction grating, r is the distance between the entrance slit and the curved diffraction grating, and $\alpha$ is the angle of incidence of the principal ray incident from the entrance slit onto the curved diffraction grating.

6 Claims, 6 Drawing Figures

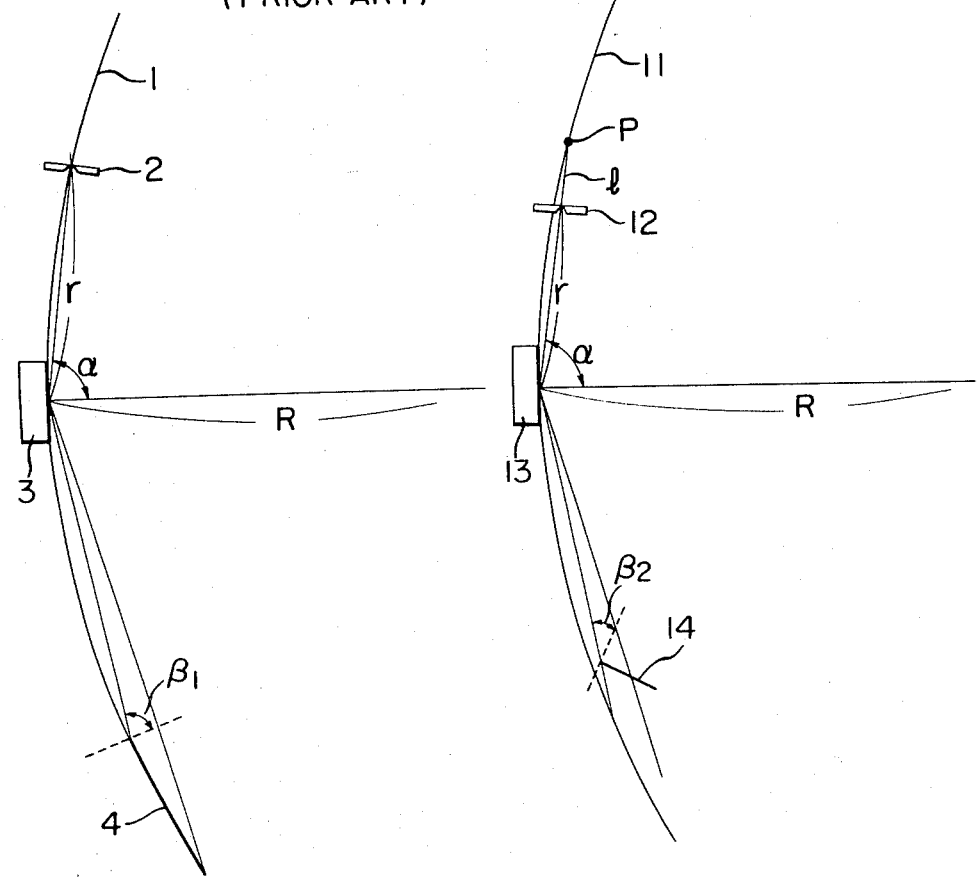
FIG. 1 (PRIOR ART)
FIG. 2
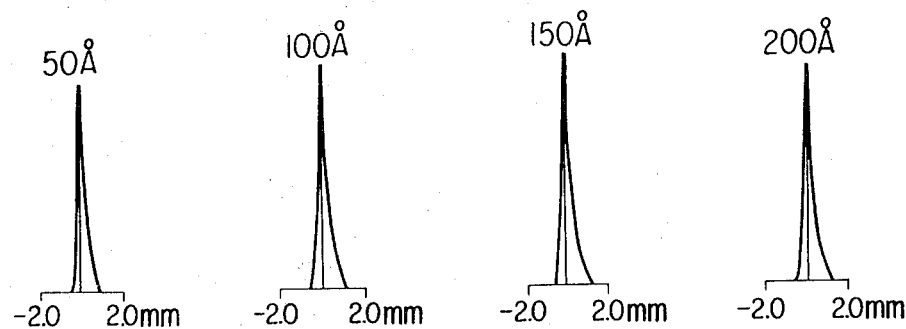
FIG. 3A  FIG. 3B  FIG. 3C  FIG. 3D

GRAZING INCIDENCE SPECTROMETER

BACKGROUND OF THE INVENTION

1. Field of the Invention

This invention relates to a grazing incidence spectrometer using a diffraction grating.

2. Description of the Prior Art

In the grazing incidence spectrometer according to the prior art, as shown in FIG. 1 of the accompanying drawings, an entrance slit 2 and a concave (spherical) diffraction grating 3 are disposed on a Rowland circle 1. At this time, the image plane is formed arcuately on the Rowland circle 1. Therefore, an exit slit movable on the image plne has been provided and a photoelectric detector has been integrally provided rearwardly of the exit slit and by moving the exit slit and the photoelectric detector on the image plane, scanning in wavelength has been effected to derive information for each wavelength. For the same reason, a photographic dry-plate has been disposed while being bent along the image plane (the Rowland circle) and by sensitizing this, the wavelength information of the entire image plane has been obtained.

Accordingly, with the above-described technique, it has been impossible to treat a plurality of types of wavelength information in real time.

Also, the angle of incidence of the diffracted light onto the image plane has been great, so that the quantity of light impinging on the photoelectric detector has been small with a result that a sufficient photoelectric output has not been obtained. On the other hand, when a photographic dry-plate has been used, the expanse of the image by the thickness of the senitive layer has been large to reduce the detection accuracy.

Further, the prior art device has suffered from a disadvantage that the angle of incidence $\beta 1$ of the diffracted light onto the image plane 4 is a grazing incidence of 80° or more and the length of the image plane is very great. That is, the entrance slit has been disposed on the Rowland circle 1 (a circle whose diameter is a principal radius of curvature R) so as to satisfy $r/R \cos \alpha = 1$, where R is the principal radius of curvature of the concave diffraction grating 3, r is the distance between the entrance slit 2 and the center of the diffraction grating, and $\alpha$ is the angle of incidence of the principal ray onto the diffraction grating (see FIG. 1).

SUMMARY OF THE INVENTION

The present invention has for its object to eliminate the above-noted disadvantages peculiar to the prior art and to provide a grazing incidence spectrometer which is capable of measuring a plurality of types of wavelength information at a time with the image plane as being planar and which can obtain a good imaging property in a wide wavelength range.

Such object is achieved by using a diffraction grating having an unequal-interval groove pattern that will make the image plane substantially planar and whose principal radius of curvature is R and by disposing the entrance slit within the Rowland circle so as to satisfy $0.7 \leq r/R \cos \alpha \leq 0.9$. More specifically, it has been empirically confirmed that where a curved diffraction grating having the unequal-interval grooves is used, if the entrance slit is placed in the Rowland circle, the angle of incidence of the diffracted light onto the image plane becomes smaller. However, if the entrance slit is placed in the Rowland circle without limit, the imaging property is aggravated and becomes unsuitable for measurement. Therefore, by disposing the entrance slit so as to satisfy the above-mentioned condition, the imaging property can be maintained good and the angle of incidence of the diffracted light onto the image plane can be made sufficiently small.

The invention will become more fully apparent from the following detailed description thereof taken in conjunction with the accompanying drawings.

BREIF DESCRIPTION OF THE DRAWINGS

FIG. 1 illustrates the prior art.

FIG. 2 illustrates an embodiment of the present invention.

FIGS. 3A-D show the intensity distributions of a plurality of wavelengths (50 Å, 100 Å, 150 Å and 200 Å) on the image plane.

DESCRIPTION OF THE PREFERRED EMBODIMENT

An embodiment of the present invention will hereinafter be described with reference to FIG. 2. In the Figure, reference numeral 11 designates a Rowland circle, reference numeral 12 denotes an entrance slit, reference numeral 13 designates a concave (spherical) or toric holographic diffraction grating, and reference numeral 14 denotes the image plane made planar by the diffraction grating 13.

The entrance slit 12 is installed within the Rowland circle 11 in the following manner. That is, when R, r and $\alpha$ are the aforementioned radius of curvature, distance and angle, respectively, if a point on the Rowland circle 11 that is spaced apart a distance $R \cos \alpha$ from the center of the diffraction grating 13 is P and a straight line passing through the point P and the center of the diffraction grating 13 is l, the entrance slit 12 is disposed at a position on the straight line l which satisfies $$0.7 \leq r/R \cos \alpha \leq 0.9.$$

By so disposing the entrance slit 12 and the diffraction grating 13, the image plane 14 is formed within the Rowland circle 11 and moreover is planar over a wide wavelength range. Also, the angle of incidence of the diffracted light onto the image plane 14 is, for example, 20°-50° with respect to the diffraction grating of conventional grating constant (1/0.6 $\mu$m–1/1.0 $\mu$m), this being much smaller than conventional.

Specific numerical values will now be shown.

EXAMPLE 1

Conditions are selected such that: $\alpha = 87°$, $r/R = 0.042$, that is $r/R \cos \alpha = 0.803$, and use has been made of holographic grating of effective grating constant 1/0.9 $\mu$m that has been prepared on the conditions shown below. The conditions on which the diffraction grating are, for example, rc = R/9.276
rd = R/18.67
$\lambda r = 0.4880$ $\mu$m
$\gamma = -54.96°$
$\delta = -22.31°$ with the positions of two mutually coherent point light sources C and D being C(rc,$\gamma$) and D(rd, $\delta$), respectively, in the polar coordinate indication wherein the center of the diffraction grating is the origin and the normaal to the origin is the reference and with the wavelength of the light being λr. As a result, the image plane has become planar over a wide wavelength range of 50-200 Å. Also, the angle of incidence $\beta_2$ onto the image plane is as small as about 31+.

Next, the intensity distributions of a plurality of wavelengths (50 Å, 100 Å, 150 Å, 200 Å) on the planar image plane 14 are shown in FIGS. 3A-D, respectively. In FIG. 3, the abscissa represents the lateral length (unit mm) of the image plane 14 and the ordinate represents the intensity of light. The wavelength resolution at this time is 30-80 which is very good.

EXAMPLE 2

If $\alpha=89°$ and r/R=0.014, that is r/R cos $\alpha$=0.802, then the image plane is planar over a wavelength range of 5-50 Å for a diffraction grating of effective grating constant 1/1.2 μm and the wavelength resolution also is good. The angle of incidence $\beta_2$ onto the image plane is as small as about 35°. The conditions on which the diffraction grating has been prepared at this time are, for example, rc=R/34.67
rd=R/91.98
λr=0.4880 μm.
γ=−67.250
δ=−19.670

Now, an anode array type photoelectric detector or a semiconductor array type photoelectric detector is disposed on the image plane made planar in the described manner, and the array of this detector is in a one-dimensional or two-dimensional pattern. Accordingly, from this detector, a plurality of types of wavelength information can be derived in parallel or time-serially and therefore, real time treatment of each type of information becomes possible. It should be noted here that the angle of incidence of the diffracted light onto the image plane 14 is small. That is, the fact that the diffracted light is incident on each photodetector on the array at a small angle of incidence when the array type photoelectric detector is disposed on the image plane 14 contributes to an increased quantity of diffracted light incident on each photodetector and improved detection accuracy.

Specific examples of the holographic grating have been shown in the above two examples, but since this holographic grating serves to make the image plane planar, it may be replaced with a diffraction grating prepared by another method of manufacture if the latter has the same action. That is, to make the groove patterns of diffraction gratings similar to one another, use may be made, for example, of either the ruling method using electronic line scanning or laser beam scanning or the mechanical ruling method using a ruling engine. Where the mechanical ruling method is employed, complicated groove patterns cannot be formed and therefore, the groove intervals may be made identical to one another.

We claim:

1. In a grazing incidence spectrometer provided with an entrance slit and a diffraction grating for diffracting the light rays incident thereon from said entrance slit and for imaging said light rays as a plurality of spectral lines, the improvement residing in that
said diffraction grating is a curved diffraction grating having a predetermined principal radius of curvature and the groove patterns thereof are formed at unequal intervals so as to make the image plane thereof substantially planar,
said entrance slit is disposed on a line segment l at a position satisfying a relation:

0.7≦r/R cos $\alpha$≦0.9, where R is said principal radius, $\alpha$ is angle of incidence of the principal ray incident from said entrance slit onto said curved diffraction grating, l is the line segment connecting between the center of said curved diffraction grating and a point on a Rowland circle of the curved diffraction grating, said point being distant from the center of said curved diffraction grating by R cos $\alpha$, and r is a distance on the line segment l between said entrance slit and the center of said curved diffraction grating,
the ray incident through said entrance slit being diffracted by said curved diffraction grating and imaging on said image plane within said Rowland circle.

2. A grazing incidence spectrometer according to claim 1, wherein said curved diffraction grating is a concave or toroidal diffraction grating.

3. A grazing incidence spectrometer according to claim 2, wherein said curved diffraction grating is a holographic grating.

4. A grazing incidence spectrometer according to claim 3, wherein the angle of incidence of the ray diffracted by said curved diffraction grating onto said image plane is 20° to 50°.

5. A grazing incidence spectrometer according to claim 4, wherein said curved diffraction grating is a holographic grating of effective grating constant 1/0.9 μm prepared under the conditions:

rc=R/9.276
rd=R/18.67
λr=0.4880 μm
γ=−54.96°
δ=−22.31° with the positions of two mutually coherent point light sources C and D being C(rc, γ) and D(rd, δ), respectively, in the polar coordinate indication wherein the center of the diffraction grating is the origin and the normal to the origin is the reference and with the wavelength of the light being λr; and other numerical conditions are selected such that $\alpha$=87°, r/R=0.042, that is, r/R cos $\alpha$=0.803, whereby said angle of incidence is about 31°.

6. A grazing incidence spectrometer, according to claim 4, wherein said curved diffraction grating is a holographic grating of effective grating constant 1/1.2 μm prepared under the conditions:

rc=R/34.67
rd=R/91.98
λr=0.4880 μm
γ=−67.250
δ=−19.670 with the positions of two mutually coherent point light sources C and D being C(rc, γ) and D(rd, δ), respectively, in the polar coordinate indication wherein the center of the diffraction grating is the origin and the normal to the origin is the reference and with the wavelength of the light being λr; and
other numerical conditions are selected such that $\alpha$=89°, r/R=0.014, that is, r/R cos $\alpha$=0.802, whereby said angle of incidence is about 35°.

* * * * *

UNITED STATES PATENT AND TRADEMARK OFFICE
CERTIFICATE OF CORRECTION

PATENT NO. : 4,380,393
DATED : April 19, 1983
INVENTOR(S) : HIROSHI NAGATA, ET AL.

It is certified that error appears in the above-identified patent and that said Letters Patent is hereby corrected as shown below:

In the Headnote, item [73] change Assignee "Nippon Kogaku K.K., Tokyo, Japan" to --Nippon Kogaku K.K. and Nihon Genshiryoku Kenkyusho, both of Tokyo, Japan--.

Column 1, line 15, "plne" should read --plane--;
Column 2, line 68, "normaal" should read --normal--.

Signed and Sealed this

Twenty-fifth Day of October 1983

[SEAL]

Attest:

GERALD J. MOSSINGHOFF

Attesting Officer

Commissioner of Patents and Trademarks